(12) United States Patent
Oda

(10) Patent No.: US 7,236,196 B1
(45) Date of Patent: Jun. 26, 2007

(54) SOLID-STATE IMAGE PICKUP APPARATUS FOR READING OUT IMAGE SIGNALS WITH PIXELS REDUCED IN A HORIZONTAL DIRECTION AND A SIGNAL READING METHOD FOR THE SAME

(75) Inventor: Kazuya Oda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 508 days.

(21) Appl. No.: 09/657,413

(22) Filed: Sep. 8, 2000

(30) Foreign Application Priority Data

Sep. 8, 1999 (JP) ................................. 11-253887

(51) Int. Cl.
*H04N 5/335* (2006.01)
*H04N 3/14* (2006.01)

(52) U.S. Cl. ..................... 348/283; 348/317; 348/320

(58) Field of Classification Search ................ 348/283, 348/305, 317, 320
See application file for complete search history.

(56) References Cited

U.S. PATENT DOCUMENTS

| | | | | |
|---|---|---|---|---|
| 4,558,365 A | * | 12/1985 | Ochi | 348/275 |
| 5,306,906 A | * | 4/1994 | Aoki et al. | 250/208.1 |
| 5,319,451 A | | 6/1994 | Sasaki et al. | |
| 5,485,204 A | * | 1/1996 | Taniji | 348/264 |
| 5,555,464 A | * | 9/1996 | Hatlestad | 348/266 |
| 5,581,357 A | | 12/1996 | Sasaki et al. | |
| 5,591,660 A | * | 1/1997 | Fujikawa et al. | 438/60 |
| 5,686,742 A | * | 11/1997 | Takeuchi | 257/233 |
| 5,689,283 A | * | 11/1997 | Shirochi | 345/698 |
| 5,894,143 A | * | 4/1999 | Tanigawa et al. | 257/236 |
| 6,452,634 B1 | | 9/2002 | Ishigami et al. | |
| 2002/0118291 A1 | * | 8/2002 | Ishigami et al. | 348/311 |

FOREIGN PATENT DOCUMENTS

| | | |
|---|---|---|
| JP | 1-303890 | 12/1989 |
| JP | A10136391 | 5/1998 |
| JP | 10-191168 | 7/1998 |

* cited by examiner

*Primary Examiner*—Tuan Ho
*Assistant Examiner*—James M. Hannett
(74) *Attorney, Agent, or Firm*—Birch, Stewart, Kolasch & Birch, LLP

(57) ABSTRACT

A solid-state image pickup apparatus includes a color filter having an R (red), G (green) and B (blue) vertical stripe pattern. During preliminary pickup, a signal feeding section feeds particular drive signals for reading signal charges out of only odd-numbered columns or even-numbered columns. As a result, the signal charges or image data reduced to, e.g., one-half in the horizontal direction are transferred along a horizontal transfer path. The signal feeding section feeds horizontal drive signals adjusted in timing to the horizontal transfer path, causing the above image data to be read out without varying reading frequency. This doubles the horizontal transfer rate to thereby improve the signal output rate during preliminary pickup despite high pixel density, and allows signals to be read out without effecting actual pickup to follow.

8 Claims, 5 Drawing Sheets

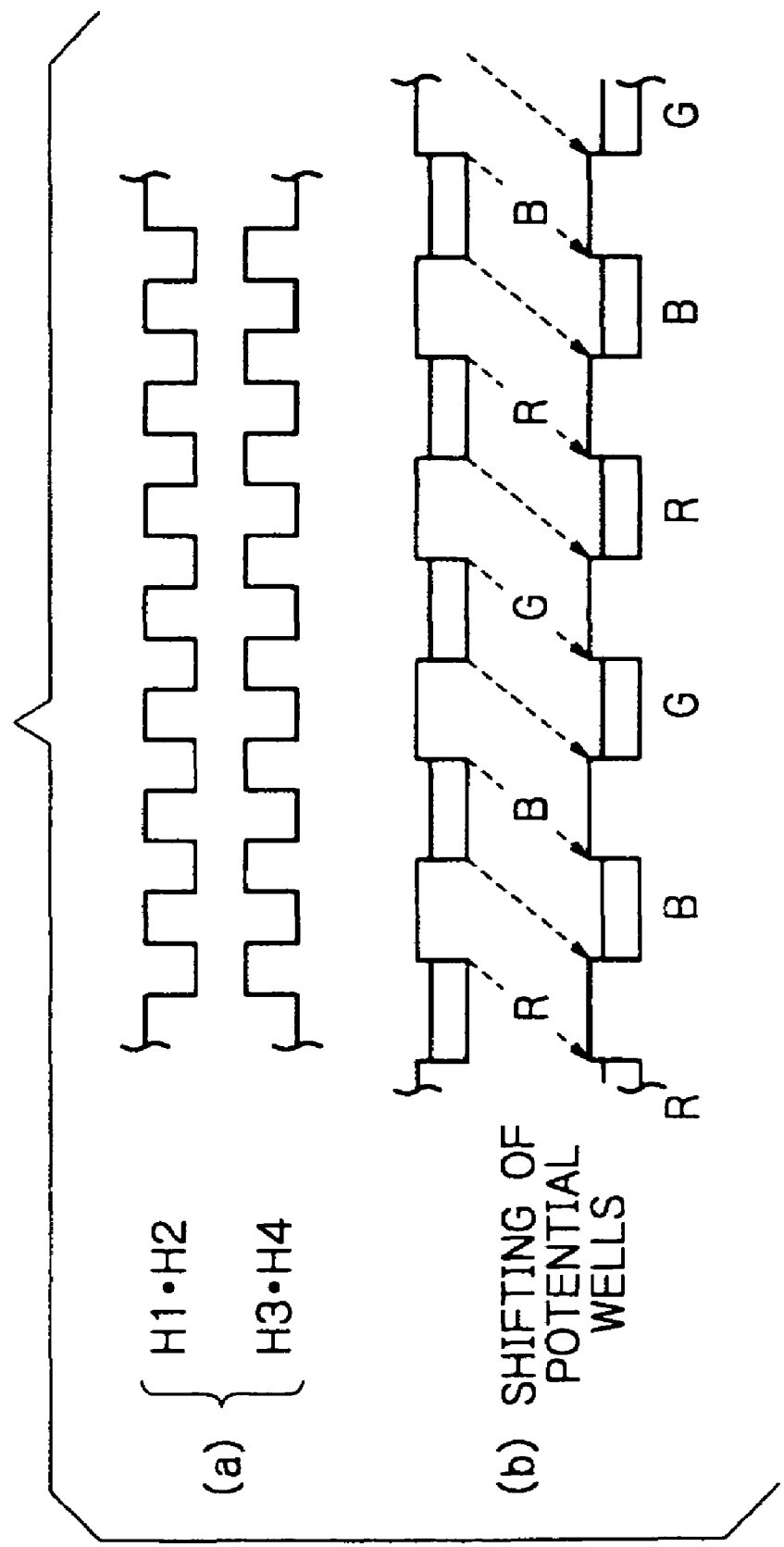

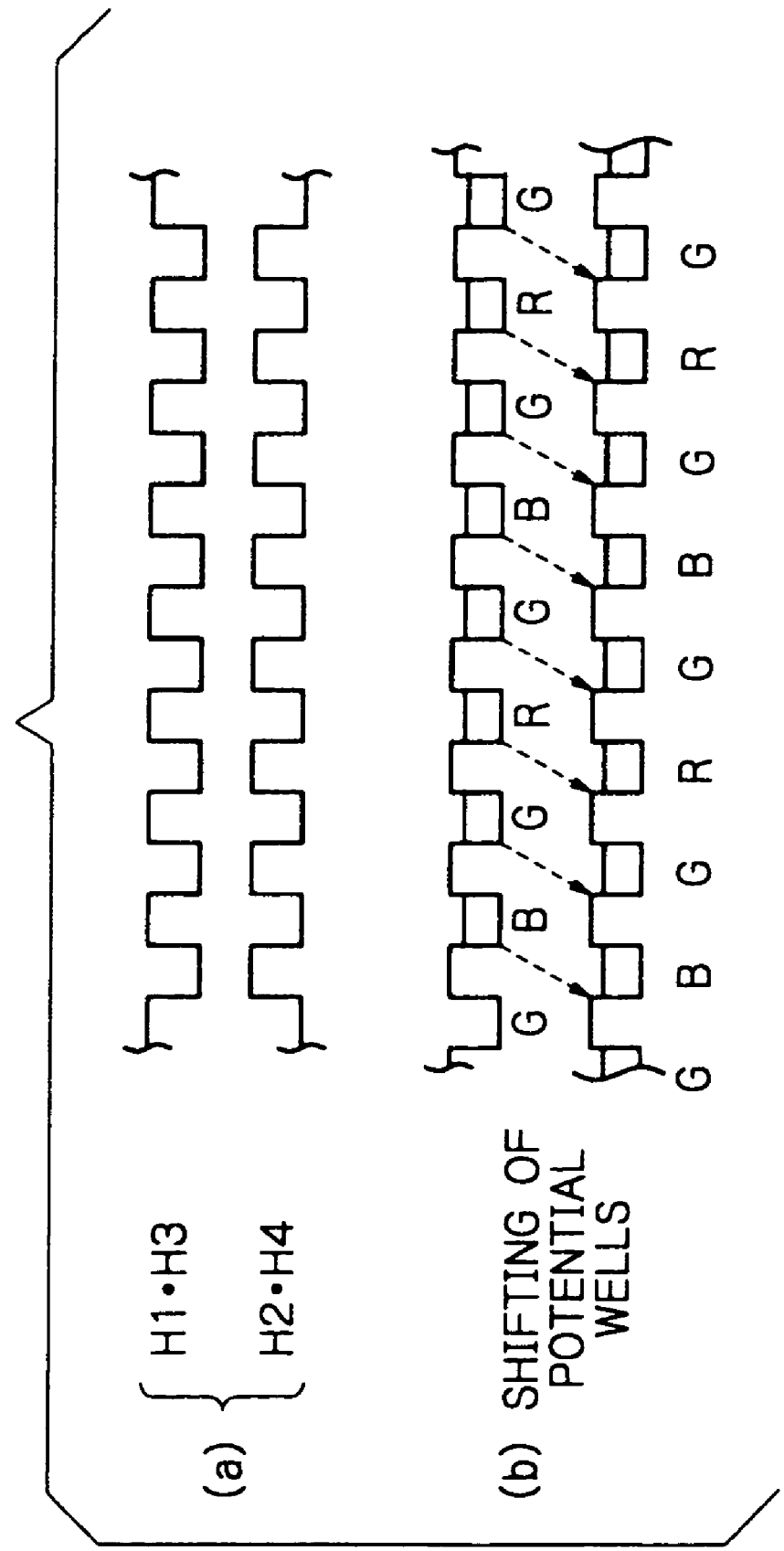

SOLID-STATE IMAGE PICKUP APPARATUS FOR READING OUT IMAGE SIGNALS WITH PIXELS REDUCED IN A HORIZONTAL DIRECTION AND A SIGNAL READING METHOD FOR THE SAME

BACKGROUND OF THE INVENTION

1. Field of the Invention

The present invention relates to a solid-state image pickup apparatus for reading out image signals with pixels reduced in a horizontal direction, and a signal reading method for the same. The present invention is advantageously applicable to, e.g., a digital camera or an image input apparatus including an image pickup section having high pixel density.

2. Description of the Background Art

To implement image quality comparable with one available with a silver halide photo-sensitive type of film, there have been proposed various technologies for increasing the number of pixels of a digital camera that electrically shoots a scene. Japanese patent laid-open publication No. 136391/1998 discloses a solid-state image pickup apparatus constructed to optimize the spatial sampling of an image, to shift pixels with respect to each other in such a manner as to enhance efficient receipt of light, and to reduce moiré and other aliasing signals.

A digital camera of the type including an image pickup section provided with high pixel density is extensively used and directed toward high image quality. It is a common practice with this type of digital camera to effect, before the actual pickup of a still picture, AE/AF (Automatic Exposure/Automatic Focusing) operation and movie drive that causes a scene being picked up to appear on an LCD (Liquid Crystal Display). This, however, brings about a problem that the high pixel density increases the period of time necessary for signal charges resulting from the pickup to be read out and thereby lowers the frame rate. It is to be noted that the high pixel density refers to more than 1,000,000 pixels or so-called megapixels.

To increase the frame rate, signal charges generated in the image pickup section may be read out while being reduced, or thinned, in the vertical direction. Specifically, assume that drive frequency CLK for reading out all of 1,500,000 pixels (1,280×1,024) by progressive scanning is 12.2725 MHZ. Then, a single horizontal synchronizing period (1 H) and a single vertical synchronizing period (1V) are 1,560 CLK and 1,050 H, respectively. The frame rate is therefore 1/7.5 second. When the signal charges are reduced to one-half in the vertical direction, 1 H needs the same period of time while 1V is 525 H, resulting in a frame rate of 66.7 milliseconds, i.e., 1/15 second. Even when the signal charges are reduced to one-fourth in the vertical direction, 1V is 262.6 H, and therefore the frame rate is as long as 33.4 millisecond or 1/30 second.

Assume that 1,500,000 pixels are read out by progressive scanning and displayed by the movie drive in the conventional image size, i.e., 640×480. Then, the pixels are reduced to one-half in the horizontal and vertical directions under the above-described conditions. As a result, the number of pixels in the horizontal direction and the number of pixels (lines) in the vertical direction are as great as 640 and 525, respectively. Even the reduction to one-fourth implements only the reduction to one-half in the horizontal direction although reducing the number of pixels in the vertical direction to 262.5, i.e., improving the frame rate. However, because the number of pixels reduced in the vertical direction is short of 480, interpolation must be executed in the vertical direction in order to match the number of pixels to the desired number. On the other hand, in the horizontal direction, all of the 1,280 pixels are read out and then reduced to 640 pixels at the subsequent signal processing stage. It will therefore be seen that strict consideration is not given to the improvement in frame rate in reducing the pixels in the horizontal direction. This is apt to prevent the operator of the camera to miss an adequate actual pickup timing.

SUMMARY OF THE INVENTION

It is therefore an object of the present invention to provide a solid-state image pickup apparatus capable of improving the signal output rate during preliminary pickup despite high pixel density or image quality and reading out signals without effecting actual pickup to follow, and a signal reading method for the same.

A solid-state image pickup apparatus of the present invention includes an image pickup section and a signal feeding section. The image pickup section includes photosensitive cells arranged bidimensionally and each being shifted from the adjoining photosensitive cells in the horizontal and vertical directions for photoelectrically transducing incident light. A color filter having R (red), G (green) and B (blue) color filter segments each are positioned in front of a particular photosensitive cell in the direction of light incidence for separating colors of incident light representative of a scene. The R, G and B color filter segments each are arranged in a vertical stripe pattern. Transfer electrodes each are assigned to a particular photosensitive cell for reading out a signal charge generated by the photosensitive cell. The apparatus sequentially performs preliminary pickup and actual pickup, which reads all of the signal charges out of the photosensitive cells, and executes digital signal processing with the resulting signals. The signal feeding section feeds transfer timing signals for transferring the signal charges generated by only part of the photosensitive cells arranged on odd-numbered columns or even-numbered columns to vertical transfer paths via the transfer electrodes associated with the above photosensitive cells. Also, the signal feeding section feeds vertical drive signals for transferring the signal charges along the vertical transfer paths toward a horizontal transfer path perpendicular to the vertical transfer paths. Further, the signal feeding section outputs horizontal drive signals adjusted in timing for transferring the signal charges along the horizontal transfer path while maintaining the color of the individual signal charge.

A signal reading method applicable to the solid-state image pickup apparatus is also disclosed.

BRIEF DESCRIPTION OF THE DRAWINGS

The objects and features of the present invention will become more apparent from the consideration of the following detailed description taken in conjunction with the accompanying drawings in which:

FIG. 3 is a view showing the phases of the horizontal drive signals and the shifting of potential wells formed by the drive signals;

FIG. 5 is a view showing the phases of the horizontal drive signals shown in FIG. 4B and the shifting of potential wells formed by the drive signals.

DESCRIPTION OF THE PREFERRED EMBODIMENT

Figure 1:
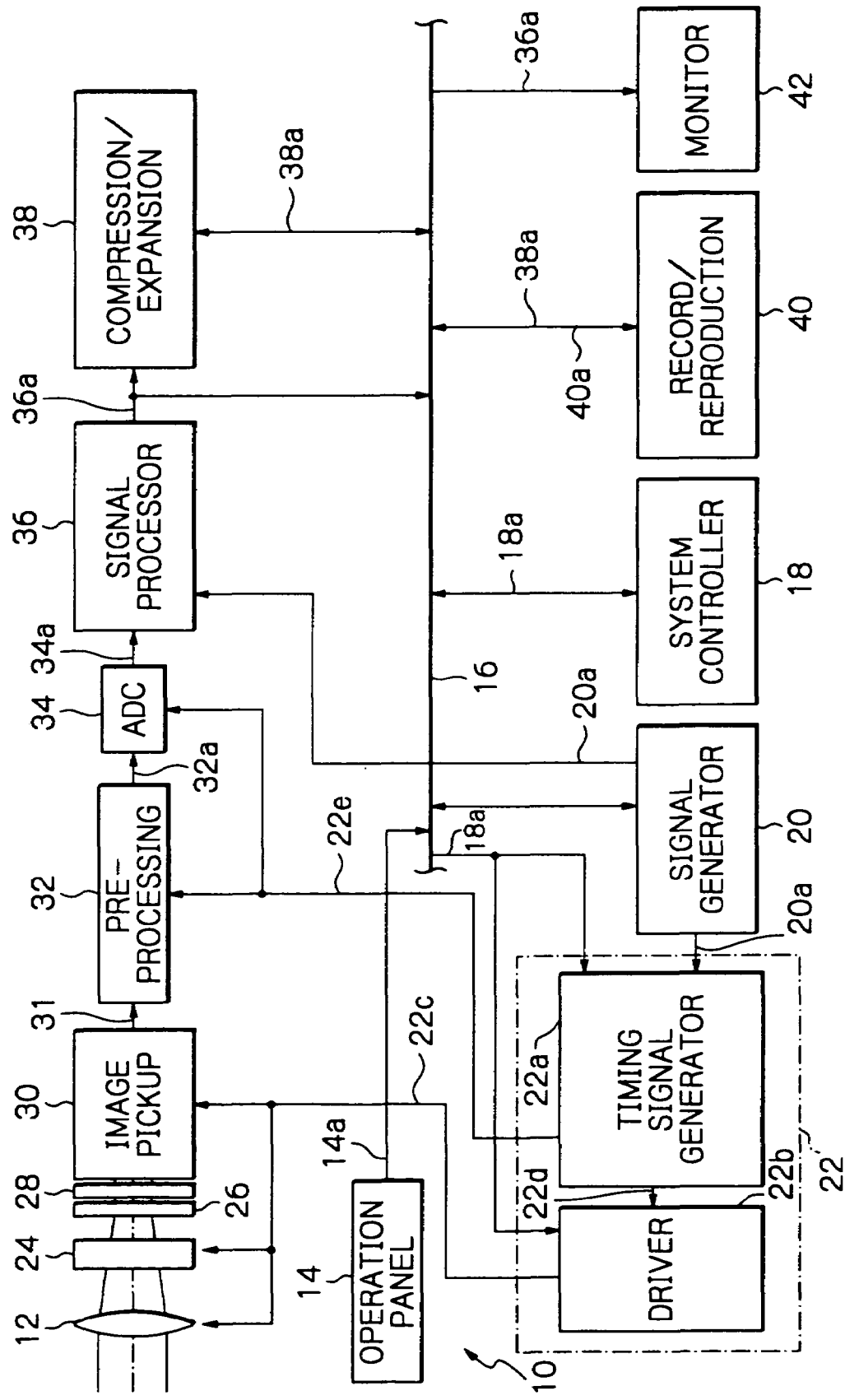
FIG. 1 is a block diagram schematically showing a solid-state image pickup apparatus embodying the present invention and implemented as a digital still camera.

Referring to FIG. 1 of the drawings, a solid-state image pickup apparatus embodying the present invention is shown and implemented as a digital still camera 10 by way of example. Part of the digital still camera 10 not relevant to the understanding of the present invention is not shown or described. In FIG. 1, signals are designated by the reference numerals attached to signal lines on which they appear. As shown, the camera 10 includes a lens system 12, an operation panel 14, a system controller 18, a signal generator 20, a timing signal feeding section 22, a diaphragm adjusting mechanism 24, an optical low-pass filter 26, and a color filter 28. The camera 10 further includes an image pickup device 30, a preprocessing circuit 32, an ADC (Analog-to-Digital Converter) 34, a signal processor 36, a compression/expansion circuit 38, a record/reproduction circuit 40, and a monitor 42.

The lens system 12 is an assembly of a plurality of optical lenses and includes a zoom mechanism and an AF control mechanism although not shown specifically. The zoom mechanism controls the positions of the lenses and therefore the angle of field in response to a signal 14a output from the operation panel 14. The AF control mechanism automatically controls the focus on the basis of the distance from the camera 10 to a desired subject. The operation panel 14 includes a shutter release button, not shown, capable of being pressed to its half-stroke position and then to its full-stroke position. When the operator of the camera 10 presses the shutter release button to, e.g., the half-stroke position, the camera 10 preliminarily picks up a scene (preliminary pickup hereinafter) before actual pickup. The zoom mechanism and AF mechanism are controlled in accordance with information derived from the preliminary pickup. The signal 14a is also delivered to the system controller 18 over a system bus 16.

The timing signal feeding section 22 is made up of a timing signal generator 22a and a driver 22b. A drive signal 22c is fed to the lens system 12 via the signal generator 20, the timing signal generator 22a, and driver 22b. After the focus, exposure and so forth have been set on the basis of the information derived from the preliminary pickup, the operator presses the shutter release button to the full-stroke position in order to actually shoot the scene. The resulting pickup timing is fed to the system controller 18. In response, the system controller 18 executes pickup control including the image pickup and signal read-out.

The operation panel 14 allows the operator to select desired one of items that may be displayed on the monitor 42. The release shutter button sends the signal 14a to the system controller 18 on the system bus 16 such that the camera 10 operates in a particular manner in accordance with each of the half-stroke and full-stroke positions of the shutter release button. In the illustrative embodiment, the operation panel 14 additionally includes a pointing device for indicating a cursor or a menu to be displayed on the monitor 42. The pointing device allows the operator to select desired modes in the event of various kinds of operation and processing. The signal 14a input to the system controller 18 is representative of various signals resulting from such functions available with the operation panel 14.

The system controller 18 includes, e.g., a CPU (Central Processing Unit) and a ROM (Read Only Memory) storing programs for operating the camera 10. The controller 18 generates control signals 18a meant for the various sections of the camera 10 in accordance with, e.g., information derived from the manipulation of the operation panel 14 and the programs stored in the ROM. Specifically, the control signals 18a are delivered not only to the signal generator 20 but also to the timing signal feed section 22, preprocessing circuit 32, ADC 34, signal processor 36, compression/expansion circuit 38, record/reproduction circuit 40, and monitor 42. Signal lines extending from the controller 18 to the blocks 22 and 32 through 42 are not shown in FIG. 1. While controlling the above various blocks, the controller 18 causes the timing signal feeding section 22 to generate particular timing signals for each of preliminary pickup and actual pickup on the bus 16. Further, the controller 18 executes unique control over the signal processor 36, as will be described specifically later.

The signal generator 20 includes an oscillator, not shown, for generating a system clock 20a under the control of the system controller 18. The system clock 20a is fed to the timing signal feed section 22 and signal processor 36. Also, the system clock 20a is applied to the system controller 18 on, e.g., the system bus 16 as a reference timing signal.

In the timing signal feeding section 22, the timing signal generator 22a includes a circuit for transforming, based on the control signal 18a, the system clock 20a to timing signals 22d used to control the various sections of the camera 10. The timing signals 22d include transfer shift gate pulses, vertical transfer timing signals, and horizontal transfer timing signals. Generally, each timing signal 22d is fed at a particular timing and provided with a particular frequency for each of preliminary pickup and actual pickup. For preliminary pickup, however, each timing signal 22d basically is not varied in frequency and is fed at a timing different from the timing assigned to actual pickup.

The image pickup device 30 includes photodiodes or photosensitive cells and transfer shift gates or transfer electrodes adjoining the photodiodes, as will be described specifically later with reference to FIGS. 2A and 2B. To vary the timings of the timing signals 22d, transfer gate pulses to be applied to the transfer shift gates are generated and selectively fed to odd-numbered columns or even-numbered columns field by field. The vertical transfer timing signals cause signals charges read out of the photodiodes to be transferred along vertical transfer paths and are generated in the conventional manner. The signal charges are then transferred along a horizontal transfer path. Paying attention to the positional relation between signals, the horizontal transfer path of the illustrative embodiment has four transfer packets (see FIGS. 2A and 2B) in contrast to two transfer packets customarily assigned to actual pickup (see FIGS. 4A and 4B). Stated another way, the transfer electrode structure of the illustrative embodiment deals with electrodes two times as great in number as the electrode structure when a signal charge is present. In the illustrative embodiment, the timing signal generator 22a generates horizontal transfer timing signals that allow a signal charge to move over the above two times greater number of packets or electrodes while maintaining the original drive phase. This configuration will be described more specifically later.

Basically, the timing signal generator 22a generates the timing signals 22d and timing signals 22e under the control of the system controller 18 in accordance with pickup modes selected by the operator. The timing signals 22d and 22e are respectively delivered to the driver 22b and various sections of the camera 10, as shown in FIG. 1. The driver 22b superposes the various timing signals to thereby generate drive signals 22c. The drive signals 22c are fed not only to the zoom control mechanism and AF control mechanism included in the lens system 12, but also to the diaphragm control 24 and image pickup device 30. The driver 22b may also be directly controlled by the system controller 18.

In the illustrative embodiment, the system controller 18 also controls the signal 22c used to read out signal charges at the time of actual pickup, although not described specifically. Briefly, the controller 18 causes, in accordance with switching control, the timing signal generator 22a to feed the field shift gate pulses only to odd-numbered columns or even-numbered columns field by field. Alternatively, the controller 18 may inhibit the driver 22b from superposing the field shift gate pulses on the drive signal 22c to be applied to the columns whose signal charges should not be read out. For horizontal drive, use is made of a frequency low enough to read out signal charges at a low rate during preliminary pickup. This successfully prevents the colors of an image to be mixed together.

The diaphragm control mechanism 24 controls the sectional area of an incident beam, i.e., a lens opening such that an optimal beam is incident to the image pickup device 30. The driver 22b feeds the drive signal 22c to the diaphragm control mechanism 24 also. The drive signal 22c causes the mechanism 24 to operate under the control of the system controller 18. The system controller 18 calculates a lens opening and an exposure time on the basis of signal charges output from the image pickup device 30 (AE processing), although not shown specifically. Control signals 18a representative of the calculated lens opening and exposure time are input to the timing signal generator 22a. In response, the timing signal generator 22a feeds the timing signal 22d to the driver 22b and causes it to deliver the corresponding drive signal 22c to the diaphragm control mechanism 24.

The image pickup device 30 has the previously mentioned photodiodes, or photosensitive cells, arranged in a plane perpendicular to the optical axis of the lens system 12. The optical low-pass filter 26 and color filter are integrally arranged in front of the photodiodes in the direction of light incidence. The low-pass filter 26 limits the spatial frequency of an optical image to below the Nyquist frequency. The color filter 28 has filter segments corresponding one-to-one to the photodiodes and effects color separation. In the illustrative embodiment, the color filter is implemented by a single plate. The configuration of the image pickup device 30, including the color filter, will be described more specifically later.

The image pickup device 30 may be implemented by a CCD (Charge Coupled Device) image sensor or a MOS (Metal Oxide Semiconductor) image sensor by way of example. The image pickup device 30 is adapted to read out signal charges generated by the photodiodes in a particular manner in the preliminary pickup mode and actual pickup mode. The signal charges are fed from the image pickup device 30 to the preprocessing circuit 32.

In the illustrative embodiment, the color filter has a so-called honeycomb arrangement and has R (red), G (green) and B (blue) color filter segments each being arranged in a vertical stripe pattern (RGB stripe pattern hereinafter).

The preprocessing circuit 32 includes a CDS (Correlated Double Sampling) circuit not shown. In the case where the image pickup device 30 is implemented by a CCD image sensor, the CDS circuit includes a clamp circuit and a sample and hold circuit. The clamp circuit clamps various kinds of noise ascribable to the image sensor in synchronism with a timing signal 22e output from the timing signal generator 22a. The sample and hold circuit samples and holds the signal charges in synchronism with the timing signal 22e. The CDS circuit delivers the resulting noise-free signals 32a to the ADC 34.

The ADC 34 quantizes the signal levels of the analog signals, or signal charges, 32a by use of a preselected quantizing level and thereby converts them to digital signals 34a. The ADC 34 delivers the digital signals 34a to the signal processor 36 in synchronism with a conversion timing clock or similar timing signal 22e output from the timing signal generator 22a.

The signal processor 36 includes a data correcting circuit, a luminance data generator, a luminance data interpolator, a high resolution, plane interpolator and a matrix processing circuit although not shown specifically. With these circuits, the signal processor 36 further enhances the quality of an image. The data correcting circuit includes a gamma correction circuit for color correction and an AWB (Automatic White Balance) circuit for automatic white balance control. The gamma correction circuit uses lookup tables listing a plurality of sets of data, i.e., digital signals to be input to a ROM and correction data to be output in accordance with the digital signals. While the data correcting circuit may be included in circuitry following the signal processor 36, it should preferably be included in the signal processor 36 in order to minimize the number of lookup tables. Such data correction is also effected in synchronism with a timing signal output from the timing signal generator 22a. The data correcting circuit delivers the correction data to the luminance data generator.

The luminance data generator operates under the control of the system controller 18. For example, this data generator weights the correction data in consideration of the arrangement of colors to thereby generate luminance data Y for pixels where the photodiodes are positioned. The luminance data Y are fed to the luminance data interpolator. The luminance data interpolator interpolates luminance data in virtual pixels each intervening between nearby luminance data Y, thereby generating plane luminance data $Y_h$. The plane luminance data $Y_h$ are delivered to the high resolution, plane interpolator.

The high resolution, plane interpolator generates R plane data, G plane data and B plane data on the basis of the plane luminance data $Y_h$ and corrected R, G and B pixel data input thereto. The R, G and B plane data are fed to the matrix processor. The plane interpolator includes memories for respectively storing the processed image data and allowing them to be read out in a nondestructive way. The plane interpolator calculates pixel data by reading the pixel data out of the memories.

The matrix processor transforms the R, G and B plane data to luminance data Y and chrominance data (R-Y) and (B-Y) capable of being displayed on the monitor 42. Specifically, the matrix processor multiplies each of the R, G and B plane data by a particular mixture ratio to thereby output the luminance data Y and chrominance data (R-Y) and (B-Y). To determine mixture ratios, use is made of conventional coefficients. A cutoff frequency containing the frequency bands of the luminance data Y and chrominance data (R-Y) and (B-Y) and not causing aliasing to occur is set in order to execute antialiasing processing. The luminance data Y are fed to an aperture adjusting circuit and have their high frequencies raised thereby. As a result, the contour of the image is enhanced. The matrix processor delivers the luminance data Y and chrominance data (R-Y) and (B-Y), or Cr and Cb, (36a) to the compression/expansion circuit 38 while delivering them to the monitor 42 on the system bus 16.

As stated above, the signal processor 36 generates the luminance data Y and chrominance data Cr and Cb 36a by using, among the pixel data output from the photodiodes, the pixel data having close correlation by way of example.

The compression/expansion circuit 38 is made up of a circuit for compressing image data with the JPEG (Joint Photographic Experts Group) scheme, and a circuit for expanding the compressed image data. During recording, the compression/expansion circuit 38 delivers compressed data 38a to the record/reproduction circuit 40 on the system bus 16 under the control of the system controller 18. Alternatively, the compression/expansion circuit 38 may simply pass the data 36a output from the signal processor 36 therethrough and transfer them to the monitor 42 on the system bus 16 under the control of the system controller 18. During reproduction, the compression/expansion circuit 38 receives data 40a read out of the record/reproduction circuit 40 on the system bus 16 and expands them. The expanded data are also fed to the monitor 42 and displayed thereby.

The record/reproduction circuit 40 is made up of a recording section for writing image data in a recording medium and a reproducing section for reading image data out of the recording medium. The recording medium may be implemented by a so-called smart medium or similar semiconductor memory, a magnetic disk or an optical disk by way of example. When use is made of a magnetic disk or an optical disk, the record/reproduction circuit 40 includes a modulator for modulating image data and a head or electromagnetic transducer for writing the modulated image data in the disk.

The monitor 42 displays, under the control of the system controller 18, the luminance data and chrominance data 36a or the R, G and B data 36a while taking account of its screen size and adjusting the timing. When the monitor 42 is implemented by an LCD (Liquid Crystal Display) and displays moving pictures, it displays, during preliminary pickup by way of example, an image halved in the number of photodiodes or pixels in the horizontal direction.

With the above-described configuration, the camera 10 adequately controls each of preliminary pickup and actual pickup in a particular manner despite that the image pickup device 30 has high pixel density. Specifically, during preliminary pickup, the camera 10 reads out signals at high speed in order to rapidly set up exposure conditions for actual pickup to follow. During actual pickup, the camera 10 reads out signals in such a manner as to obviate color mixture ascribable to the fall of transfer efficiency that occurs in a low-illumination image area. This is successful to enhance the quality of the entire picture without regard to illumination.

Figure 2A:
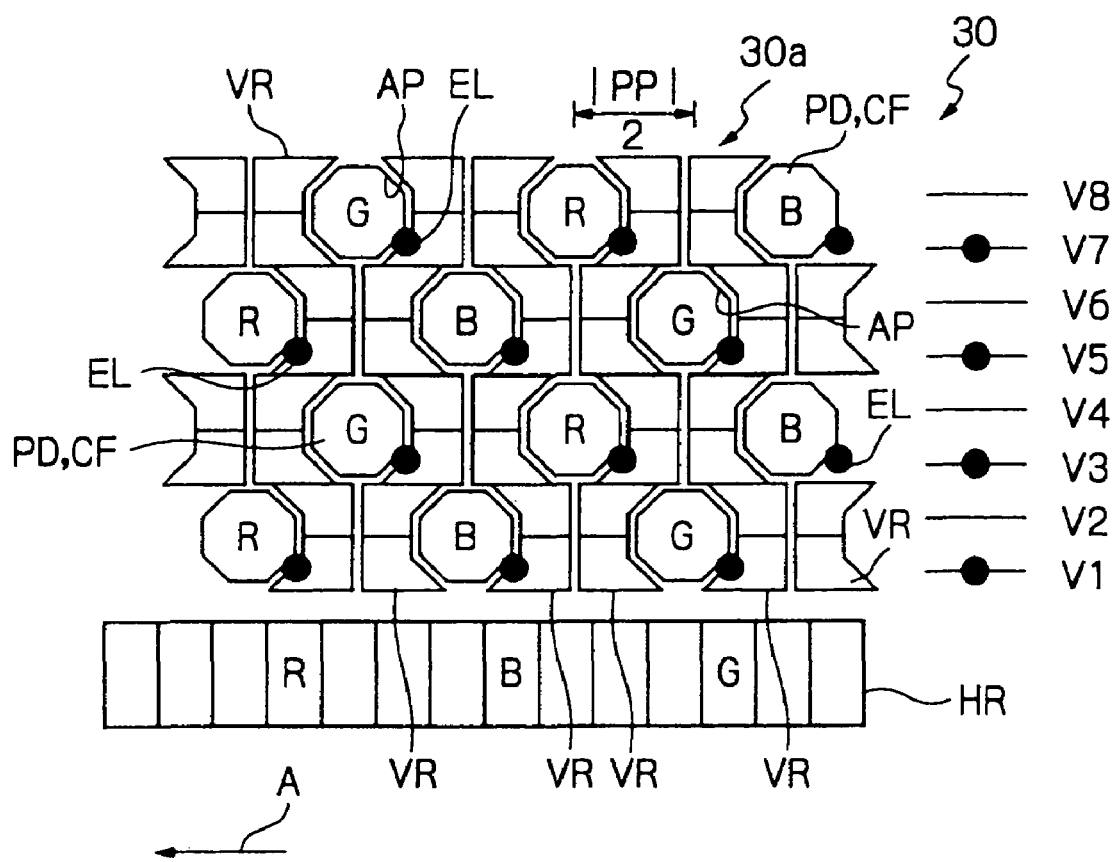
FIGS. 2A and 2B are schematic views showing the photosensitive array of an image pickup section included in the illustrative embodiment, as seen from the light incidence side, together with a relation between signal charges transferred in the horizontal direction and a relation between horizontal drive signals.
Figure 2B:
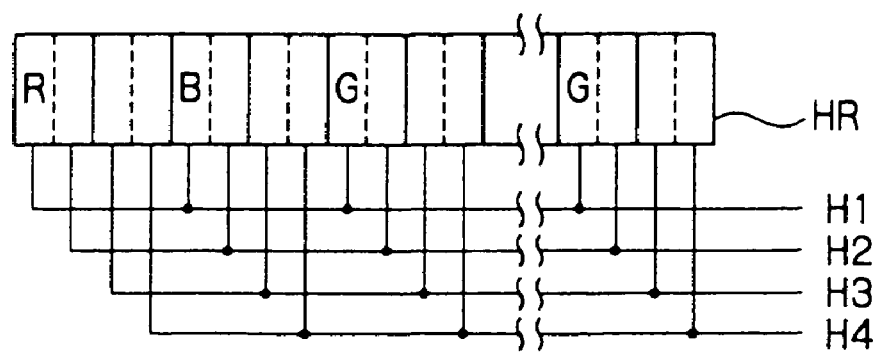

Reference will be made to FIGS. 2A and 2B for describing the image pickup device 30 and color filter 28 specifically. FIG. 2A shows a positional relation between the photosensitive array of the image pickup device 30 and vertical transfer drive signals V1 through V8 output from the driver 22b. As shown, the image pickup device 30 includes photosensitive portions 30a in which photodiodes or photosensitive cells PD are arranged bidimensionally for photoelectrically transduce incident light. Each photodiode PD is shifted from the adjoining photodiodes PD in the vertical and horizontal directions, as illustrated. The photosensitive portions 30a each are formed with an aperture AP in the front thereof. Signal charges are read out of the photodiodes PD via electrodes EL that are so arranged as to skirt round the apertures AP. The signals read out via the electrodes EL are transferred vertically along vertical transfer registers or vertical transfer paths VR. Subsequently, the signals are transferred horizontally, i.e., in the direction perpendicular to the vertical transfer registers VR along horizontal transfer registers or horizontal transfer path HR.

The vertical transfer registers VR transfer the signals in accordance with the vertical transfer drive signals V1 through V8. Specifically, four vertical transfer registers or electrodes VR are assigned to each photosensitive portion 30a. Each photosensitive portion 30a has two regions, or registers VR, adjoining each other in the horizontal direction, i.e., when the photodiodes PD shifted from each other are seen in the horizontal direction. The two adjoining regions refer to two packets. The horizontal transfer registers HR each simultaneously operate two electrodes as a unit in matching relation to the above arrangement of the vertical transfer registers VR.

In the illustrative embodiment, the apertures AP are formed in the image pickup device 30 in a honeycomb pattern, and each has an octagonal shape. While the apertures AP a square lattice configuration, the crux is that the apertures AP be capable of enhancing sensitivity and providing the vertical transfer registers VR with the same width to thereby prevent transfer efficiency from decreasing. The apertures AP may therefore have a polygonal shape, a square lattice shape rotated by 45 degrees (e.g. rhombic) or even a hexagonal shape.

As also shown in FIG. 2A, the color filter 28 has color filter segments CF each covering one of the apertures AP. The filter segments CF each are positioned just in front of a particular photodiode PD. Assume that the distance between nearby photodiodes PD is a pixel pitch PP. Then, the apertures AP are arranged in rows and columns that are shifted by the pixel pitch PP horizontally and vertically, as illustrated. When the apertures AP are polygonal, they may be more densely arranged in matching relation to the polygon. In such a case, apertures AP in rows and columns may be shifted from each other by one-half of the pixel pitch PP. For example, when the apertures AP are octagonal, as shown in FIG. 2A, they may be shifted by one-half of the pixel pitch PP (|PP|/2) in both of the horizontal and vertical directions. In this manner, the dense arrangement of the apertures AP depends on the shape of each aperture AP.

In FIG. 2A, the photodiodes PD arranged in a vertical stripe at the left end of the image pickup device 30 and labeled R is assumed to be an odd-numbered column. As indicated by dots in FIG. 2A, the vertical drive signals V1, V3, V5 and V7 each containing field shift gate pulses are applied to particular electrodes EL.

How the camera 10 operates when the shutter release button is pressed to its half-stroke position assigned to preliminary pickup will be described hereinafter. This operation is unique to the illustrative embodiment. FIG. 2A shows the image pickup device 30 in a preliminary pickup condition wherein signals are read out at high speed. First, before the condition of FIG. 2A occurs, signal charges are read out of the photodiodes PD arranged on odd-numbered columns. For this purpose, the timing signal generator 22a included in the timing signal feeding section 22 feeds field gate pulses only to the vertical drive signals V1 and V5. The drive signals V1 and V5 with the field gate pulses superposed thereon are applied to the electrodes EL, so that field shift gates associated with the electrodes EL are turned on. The driver 22b sends four-phase vertical drive signals to the vertical transfer paths VR in order to transfer the signal charges along the vertical transfer paths VR. FIG. 2A shows a condition wherein the signal charges have been transferred from the vertical transfer paths VR to the horizontal transfer path HR by one packet of the paths VR. As shown in FIG. 2B, horizontal drive signals H1 through H4 are sequentially fed to the packets of the horizontal transfer path HR.

By the vertical transfer, the signal charges are positioned on the horizontal transfer path HR in a relation of "_,_,_,R,_,_,_,B,_,_,_, G,_,_,_, . . .". It is to be noted that the symbol "_" is representative of a vacant packet where a signal charge is absent. The horizontal transfer path HR has a four-electrode structure similarly, as stated earlier. As shown in FIG. 2A, the signal charges are present in every fourth packet. It will therefore be seen that the transfer of the signal charges in a direction A shown in FIG. 2B is effected at a rate equivalent to one available with four-phase drive. More specifically, because four-phase drive usually transfers signal charges by one electrode (packet) in one-fourth of a single period, signal charges can be transferred by four electrodes (packets) in a single period. Therefore, two-phase drive originally effected, but at a rate equivalent to one available with four-phase drive, successfully doubles the transfer rate without the reading frequency being varied.

The above-described relation is shown in FIG. 3 in terms of the timings for feeding the horizontal drive signals H1 through H4 and the resulting shifting of potential wells with respect to time. As shown in FIG. 3, part (a), the horizontal drive signals H1 and H2 are identical with each other and fed at the same timing in order to double the region of the same phase. This is also true with the horizontal drive signals H3 and H4. Consequently, a potential well is formed over each two packets, causing the signal charges to be sequentially transferred on a packet basis. It is therefore possible to read out the signal charges input to the horizontal transfer path HR at a doubled transfer rate simply by varying the timings of the horizontal drive signals, while maintaining two-phase drive and having a four-electrode structure.

For example, assume that the image pickup device 30 has 1,280 pixels in the horizontal direction. Then, during preliminary pickup, signal charges are read out of only 640 pixels at a doubled reading speed. The unique arrangement of the filter segments CF obviates color mixture despite that the pixels are mixed in the vertical direction. By combining such vertical pixel mixture and the horizontally reduced drive particular to the illustrative embodiment, it is possible to promote accurate calculations for AE/AF in, e.g., a dark scene.

To read signal charges out of only even-numbered columns, an arrangement may be made such that the timing signal generator 22a delivers vertical drive timing signals and field shift gate pulses to the driver 22b and causes the driver 22b to superpose them. In such a case, the driver 22b should only feed the superposed vertical drive signals V3 and V7 to the image pickup device 30 (see FIG. 2A).

FIG. 3, part (b), shows potential wells formed in the horizontal transfer path HR. As shown, barriers exist between nearby signal charges and allow the signal charges to be read out without color mixture.

While the foregoing description has concentrated on preliminary pickup, actual pickup with the camera 10 is also apt to bring about the defective transfer of a low-illumination region due to the current trend toward high horizontal drive frequency and low drive voltage. Consequently, color mixture occurs in the low-illumination region and degrades image quality, i.e., color reproducibility. Such degradation of image quality is aggravated due to the increasing demand for high pixel density and low power consumption.

In light of the above, at the time of actual pickup, signal charges are read out of each of the odd-numbered columns and even-numbered columns of photodiodes PD, FIG. 2A, at a particular timing in the same manner as during preliminary pickup. This obviates the degradation of image quality ascribable to color mixture and occurring in, e.g., a dark scene (pickup with low illumination). The term "particular timing" mentioned above refers to, e.g., a particular field or a particular frame. When such intervals are applied to the read-out of signal charges during actual pickup, the signal charges can be read out with a margin with respect to time without any deterioration.

Figure 4A:
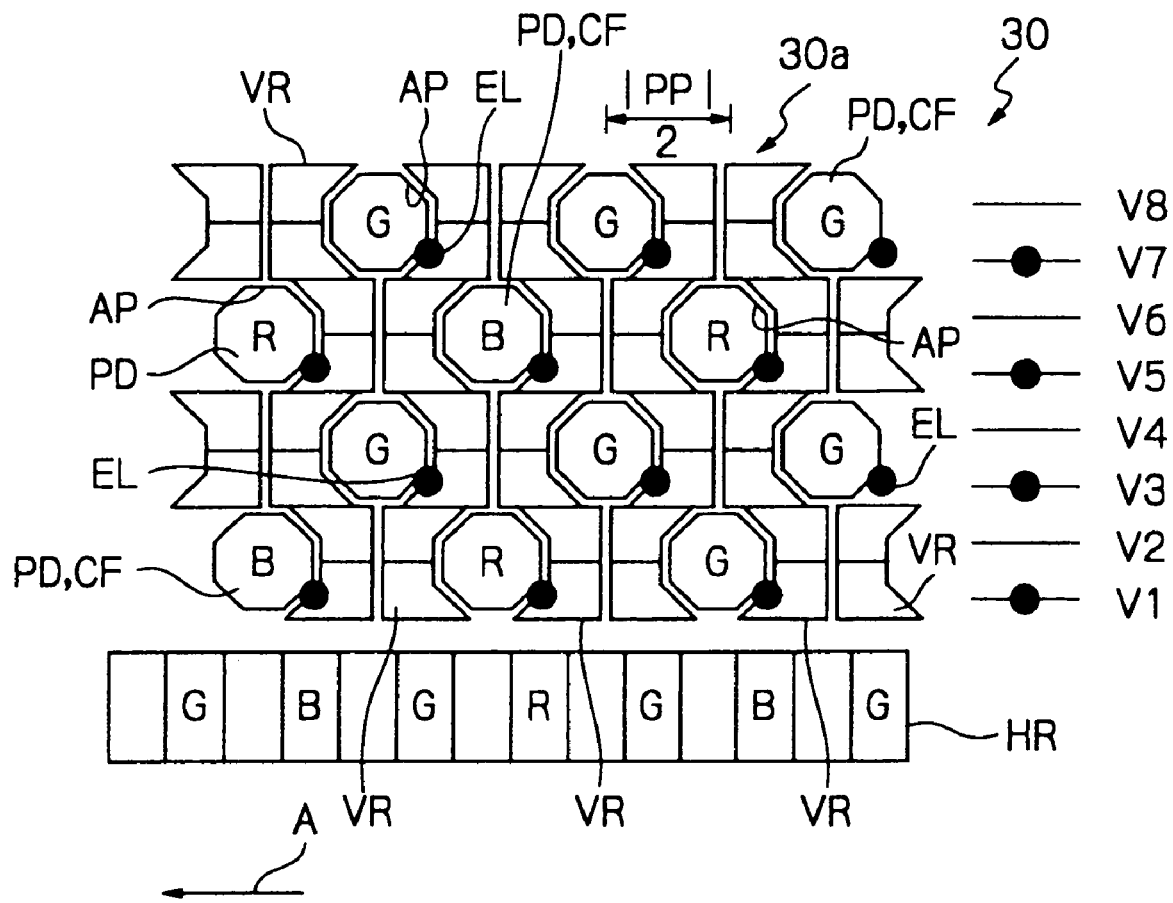
FIGS. 4A and 4B are schematic views showing the photosensitive array of an image pickup section included in a digital still camera, as seen from the light incidence side, together with a relation between signal charges transferred in the horizontal direction and a relation between horizontal drive signals.
Figure 4B:
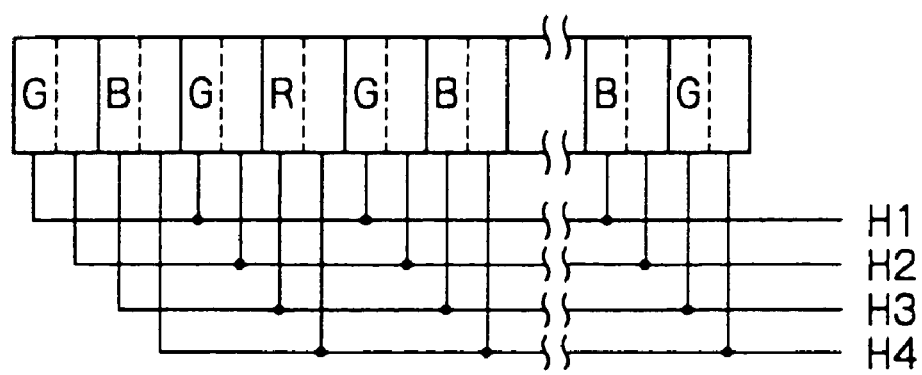

For comparison, another arrangement for reading signal charges out of the image pickup device 30 will be described with reference to FIGS. 4A and 4B. As shown in FIG. 4A, the image pickup device 30 is identical with the image pickup of FIG. 2A except that the filter segments of the color filter are arranged in, e.g., a G square, RB full checker pattern. While this pattern is also an octagonal pattern, it has G filter segments arranged in a square lattice and has R or B filter segments arranged at the centers of the square lattice, i.e., in an RB full checker pattern. Signal charges are read out of the photodiodes PD by progressive scanning. The field shift gate pulses generated by the timing signal generator 22a are superposed on the vertical drive timing signals so as to produce the vertical drive signals V1, V3, V5 and V7. To read signal charges out of the photodiodes PD, the driver 22b feeds the vertical drive signals V1, V3, V5 and V7 to the electrodes or field shift gates EL. As a result, signal charges are output from both of the odd and even-numbered columns to the vertical transfer paths VR at the same time.

Assume that in the configuration shown in FIG. 4A the signal charges are simply read out of only the odd-numbered columns or the even-numbered columns at a time, as in the illustrative embodiment. Then, only the colors R and B or the color G is read out line by line in the horizontal direction because of the G square, RB full checker pattern. That is, the colors R, G and B do not appear together on a single line, obstructing adequate interpolation at the signal processing stage. However, because the photodiodes PD are shifted in the above color filter pattern, signal charges can be simultaneously read out of two lines without color mixture and output to the horizontal transfer path HR, as shown in FIG. 4A. As shown in FIG. 4B, the horizontal transfer path HR has a four-electrode structure and transfers the signal charges by using a single packet as a barrier.

As shown in FIG. 5, part (a), the arrangement performs two-phase drive in transferring signal charges on the horizontal transfer path HR. Specifically, the horizontal drive signals H1 and H3 are fed in one phase while the horizontal drive signals H2 and H4 are fed in the other phase. The horizontal drive signals H1 and H3 generate potential wells, as shown at the top of FIG. 5, part (b). Subsequently, the horizontal drive signals H2 and H4 are fed and cause the potential wells to move by one packet, as shown at the button of FIG. 5, part (b). Such a procedure is repeated to read two lines of signal charges as a single line. This kind of signal reading scheme, however, does not give consideration to pixel reduction in the horizontal direction, i.e., reads out signal charges in the same manner as during actual pickup of the illustrative embodiment. The conventional scheme therefore needs, in the event of high-speed reading, a period of time two times longer than the period of time particular to the illustrative embodiment. The long reading time ascribable to priority given to image quality is not desirable from the operation standpoint. For example, if the preliminary pickup is slow, then the operator cannot set up pickup conditions at a desired timing before actual pickup and must, in the worst case, simply wait without any shot.

As stated above, in the illustrative embodiment, the camera 10 includes the octagonal color filter 28 in which three primary colors R, G and B each are arranged in a vertical stripe. The timing signal feeding section 22 feeds drive signals assigned to preliminary pickup to the image pickup device 30. Specifically, during preliminary pickup, signal charges are read out of only the odd-numbered columns or the even-numbered columns to thereby effect pixel reduction. When the signal charges are transferred along the horizontal transfer path HR, the horizontal drive signals are fed such that each two packets form the same potential. The signal charges can therefore be read out by two-phase drive as if they were read out by four-phase drive, without the reading frequency being varied. This doubles the horizontal transfer rate and therefore prevents the operator from, e.g., missing a shutter chance at the time of actual pickup despite that the image pickup device 30 has high pixel density. The illustrative embodiment therefore frees the operator from uneasiness and insures high image quality.

In summary, in accordance with the present invention, a solid-state image pickup apparatus includes a color filter having an R, G and B vertical stripe pattern. During preliminary pickup, a signal feeding section feeds particular drive signals for reading signal charges out of only odd-numbered columns or even-numbered columns. As a result, the signal charges or image data reduced to, e.g., one-half in the horizontal direction are transferred along a horizontal transfer path. The signal feeding section feeds horizontal drive signals adjusted in timing to the horizontal transfer path, causing the above image data to be read out without varying reading frequency. This doubles the horizontal transfer rate and therefore prevents the operator from, e.g., missing a shutter chance at the time of actual pickup despite that an image pickup section has high pixel density. The present invention therefore frees the operator from uneasiness and insures high image quality.

The entire disclosure of Japanese patent application No. 253887/1999 filed Sep. 8, 1999 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
an image pickup section; and
a signal feeding section;
said image pickup section comprising:
photosensitive cells for photoelectrically transducing incident light representative of a scene, said photosensitive cells being arranged bidimensionally in such position that each of said photosensitive cells is shifted in position substantially halfway from adjoining ones of said photosensitive cells in a horizontal and a vertical direction;
a color filter having R (red), G (green) and B (blue) color filter segments for separating colors of the incident light, each of the color filter segments being positioned in front of a particular one of said photosensitive cells in a direction of the incident light and being arranged in a vertical stripe pattern in which the segments of a same color form a column in the vertical direction;
first transfer electrodes, each being assigned to a particular one of said photosensitive cells, for reading out a signal charge generated by said particular photosensitive cell, second transfer electrodes assigned to vertical transfer paths, and third transfer electrodes assigned to a horizontal transfer path substantially perpendicular to the vertical transfer paths for forming at least one vacant packet between packets holding the signal charges transferred from said vertical transfer paths; and
control circuitry for sequentially performing preliminary pickup and actual pickup, which reads all of the signal charges out of said photosensitive cells, and executing digital signal processing with signals resultant from the signal charges read out;
second signal feeding section feeding transfer timing signals for transferring the signal charges generated by ones of said photosensitive cells which are positioned on odd or even-numbered ones of the columns to the vertical transfer paths via said first transfer electrodes associated with said photosensitive cells on odd-or even-numbered lines, vertical drive signals for transferring the signal charges along said vertical transfer paths toward said horizontal transfer path, and horizontal drive signals adjusted in timing for transferring the signal charges along said horizontal transfer path while maintaining a color of the signal charges, wherein each photosensitive cell is assigned four vertical transfer registers the vertical transfer registers grouped in pairs in the vertical direction and formed on both sides of the photosensitive cell in the horizontal direction, where adjacent pairs assigned to adjacent photosensitive cells shifted in position are adjoined to form the vertical transfer paths.

2. An apparatus in accordance with claim 1, wherein in the event of the preliminary pickup said signal feeding section output said horizontal drive signals such that a well is formed in each packet of said horizontal transfer path adjoining a packet storing the individual signal charge at the same time as a well formed in said packet storing said individual signal charge.

3. An apparatus in accordance with claim 1, wherein said signal feeding section outputs said horizontal drive signals such that a range of said horizontal transfer path driven in a same phase and derived from an electrode structure of said horizontal transfer path is doubled.

4. An apparatus in accordance with claim 3, wherein when said horizontal transfer path has a four electrode structure, said signal feeding section outputs said horizontal drive signals such that two phases are combined into a single phase.

5. A method of reading signal charges generated by photosensitive cells, which are arranged bidimensionally in such positions that each of said photosensitive cells is shifted in position substantially halfway from adjoining ones of said photosensitive cells in a horizontal and a vertical direction for photoelectrically transducing incident light of particular separated color representative of a scene, in a particular manner for preliminary pickup and actual pickup, which reads all of the signal charges out of said photosensitive cells for recording the signal charges, said method comprising the steps of:

(a) positioning in front of said photosensitive cells in a direction of the incident light a color filter, which has color filter segments of three primary colors R, G and B each for separating colors of the incident light and arranged in a vertical stripe pattern in which the segments of same color form a column in the vertical direction, and forming transfer electrodes, each of which is assigned to a particular one of the photosensitive cells for reading out a signal charge generated by said particular photosensitive cell, said transfer electrodes respectively contacting said photosensitive cells, wherein each photosensitive cell is assigned four vertical transfer registers, the vertical transfer registers grouped in pairs in the vertical direction and formed on both sides of the photosensitive cell in the horizontal direction, where adjacent pairs assigned to adjacent photosensitive cells shifted in position are adjoined to form the vertical transfer paths;

(b) generating drive signals for reading out the signal charges generated by said photosensitive cells and representative of an image picked up;

(c) rendering conductive, during the preliminary pickup, the transfer electrodes associated with ones of the photosensitive cells which are positioned on odd or even-numbered lines in response to the drive signals to reduce pixels in the horizontal direction by vertical thinning, where each of said photosensitive cells is shifted in position from adjoining ones of said photosensitive cells in a horizontal and a vertical direction;

(d) transferring the signal charges read out in said step (c) in the vertical direction in response to the drive signals; and (e) transferring the signal charges having transferred in said step (d) in the horizontal direction perpendicular to said vertical direction with a timing of the drive signals being adjusted.

6. A method in accordance with claim 5, wherein said step (b) comprises the step (f) of generating, in the event of the preliminary pickup, horizontal drive signals such that a well is formed in each packet horizontally adjoining a packet storing an individual signal charge at the same time as a well formed in said packet storing said individual signal charge.

7. A method in accordance with claim 5, wherein said step (e) comprises the step (g) of generating said drive signals such that a range of a same phase is doubled in the horizontal direction.

8. A method in accordance with claim 7, wherein, when four-phase drive signals are used for usual horizontal transfer, said step (e) comprises the step (h) of generating said drive signals such that two phases are combined into a single phase.

* * * * *